(12) United States Patent
De Tricaud et al.

(10) Patent No.: US 8,424,288 B2
(45) Date of Patent: Apr. 23, 2013

(54) DETECTION OF LEAKAGE IN AN AIR SYSTEM OF A MOTOR VEHICLE

(75) Inventors: Stephane De Tricaud, Stuttgart (DE); Danny Jaeger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 12/725,164

(22) Filed: Mar. 16, 2010

(65) Prior Publication Data

US 2010/0236218 A1 Sep. 23, 2010

(30) Foreign Application Priority Data

Mar. 18, 2009 (DE) .......................... 10 2009 001 626
Jul. 8, 2009 (DE) .......................... 10 2009 027 519

(51) Int. Cl.
*F02M 25/06* (2006.01)
(52) U.S. Cl.
USPC .................................. 60/278; 60/273; 60/285
(58) Field of Classification Search .................... 60/278; 123/330–333, 396, 568.16, 698; 701/103, 701/104, 108, 109, 110, 114, 115
See application file for complete search history.

(56) References Cited

U.S. PATENT DOCUMENTS

| 6,850,834 | B1 * | 2/2005 | Yu et al. | 701/108 |
| 2003/0230287 | A1 * | 12/2003 | Ozeki et al. | 123/479 |
| 2008/0209892 | A1 * | 9/2008 | Post et al. | 60/287 |
| 2009/0013665 | A1 * | 1/2009 | Brahma | 60/276 |
| 2009/0229586 | A1 * | 9/2009 | Post et al. | 123/699 |

FOREIGN PATENT DOCUMENTS

DE 10 2007 010 189 9/2008

* cited by examiner

*Primary Examiner* — Thomas Denion
*Assistant Examiner* — Jason Shanske
(74) *Attorney, Agent, or Firm* — Kenyon & Kenyon LLP

(57) ABSTRACT

A method is described for operating an internal combustion engine in motor vehicles, in which air is supplied to a combustion chamber via a throttle valve and an air supply channel, and in which exhaust gas is conducted through a particulate filter and is returned at least intermittently and at least partially through an exhaust gas recirculation valve into the air supply channel, and in which an oxygen proportion in the exhaust gas is detected using at least one lambda probe. In this context, in an overrun operation, the throttle valve is controlled to close and the exhaust gas recirculation valve is controlled to open, a variable characterizing the oxygen concentration in the exhaust gas is compared to a boundary value, and as a function of the result of the comparison, it is concluded that there is a leakage in the air supply channel.

19 Claims, 3 Drawing Sheets

DETECTION OF LEAKAGE IN AN AIR SYSTEM OF A MOTOR VEHICLE

RELATED APPLICATION INFORMATION

The present application claims priority to and the benefit of German patent application no. 10 2009 001 626.0, which was filed in Germany on Mar. 18, 2009, and German patent application no. 10 2009 027 519.3, which was filed in Germany on Jul. 8, 2009, the disclosures of which are incorporated herein by reference.

FIELD OF THE INVENTION

The present invention relates to a method, as well as a computer program, an electrical storage medium and a control and/or a regulating device for a system for exhaust gas aftertreatment in motor vehicles.

BACKGROUND INFORMATION

An internal combustion engine is understood to be known in the market, that is equipped with a particulate filter, and in which the soot burn-off is controlled or checked, in order to protect the particulate filter. Such a system, with the corresponding method, is discussed in DE 10 2007 010 189 A1, in order to regulate the temperature of the exhaust gas during a regeneration process of a particulate filter.

In the regeneration operation of a particulate filter, a high oxygen supply in the overrun phase of the internal combustion engine would, for instance, lead to a locally reinforced soot burn-off. At lower engine speeds, the exhaust gas mass flow is too low for a sufficient heat dissipation, which may lead to thermally conditioned damage to the particulate filter. For this reason, by closing the throttle valve and opening the exhaust gas recirculation valve, exhaust gas may be pumped in circulating fashion, in order to make no, or little oxygen available to the particulate filter. In the case of a leakiness of the air system or its components, such as an untight throttle valve, this measure no longer acts within the desired scope, and the temperature stress of the particulate filter could become greater than desired.

SUMMARY OF THE INVENTION

It is an object of the exemplary embodiments and/or exemplary methods of the present invention to increase the service life of the exhaust gas system.

This object may be attained by a method, as well as a computer program, an electrical storage medium and a control or/a regulating device for a system for exhaust gas aftertreatment in motor vehicles. Advantageous further developments are indicated in the dependent claims. Important features for the exemplary embodiments and/or exemplary methods of the present invention are also found in the following description and in the drawings, the features being able to be essential for the exemplary embodiments and/or exemplary methods of the present invention both alone and also in different combinations, without further explicit reference being made to it.

The exemplary embodiments and/or exemplary methods of the present invention have the advantage that leakage in the air supply channel is able to be detected. Consequently, appropriate measures may be taken in order to prevent an undesirably high temperature in the Diesel particulate filter in the regeneration operation, which is of advantage to the service life of the Diesel particulate filter. It is understood, in this context, however, that leakage in the air supply channel may have quite different causes: a wall of the air supply channel may have a hole in it, for example, a connection may have become loose or there may be a leakage place in the region of the throttle valve (throttle valve does not quite close). The measure according to the exemplary embodiments and/or exemplary methods of the present invention may be implemented without additional built-in components, in this context, so that hardly any additional costs are created.

Starting from a diagnosis of leakiness of the air supply channel, reactions are able to take place. For instance, the regeneration of the particulate filter may be limited, interrupted or broken off, or a late post-injection may be released into the oxidation catalyst of the exhaust gas aftertreatment system during an overrun phase of the internal combustion engine.

The stress on a control unit is reduced if the comparison of a variable, characterizing the oxygen concentration in the exhaust gas, to the boundary value is only carried out if the current rotational speed of the internal combustion engine (engine speed) is below a boundary value. A leakage would be harmful only in this operating range.

It is also favorable if the comparison of a variable, characterizing the oxygen concentration in the exhaust gas, to a boundary value is only carried out if no faults at the throttle valve and the exhaust gas recirculation valve have been diagnosed. In the case of such defects, a substitute reaction will usually already have been provided.

The diagnosis of a leakiness in the air system is particularly certain if the comparison of a variable, characterizing the oxygen concentration in the exhaust gas, to a boundary value is only carried out if a rotational speed gradient of an engine speed lies below a boundary value for a certain minimum time period. Using this presupposition, operating conditions are excluded which could lead to fluctuations in the variable and could falsify the diagnosis of leakiness. In connection with a motor vehicle, this would include, for instance, shifting gears.

One meaningful design occurs when the comparison of a variable, characterizing the oxygen concentration in the exhaust gas, to a boundary value is only carried out if there exists an overrun operation of the internal combustion engine for a certain minimum time period. With that, sufficient stable conditions set in for the variables used for the diagnosis of leakiness.

In addition, it is proposed that, under certain conditions in an overrun operation, fuel be injected for holding down the lambda value, and the fact that there is a leakage in the air supply channel should only be concluded if the certain conditions are present, and that, in spite of the fuel injection, the lambda value reaches and/or exceeds a boundary value, or if these certain conditions are not present. With that, the detection of leakage in the air supply channel compared to the possible holding down of the lambda value is assigned a lower priority, so that the measures, provided under the certain circumstances, may first of all be carried out. This is based on the following consideration:

In order to prevent damage in a Diesel particulate filter in the overrun operation, based on too high an oxygen concentration in the exhaust gas, it may be provided that a small post-injection be performed in order to keep the lambda value low. The time of such a post-injection may occur in such a way that the post-injected fuel quantity is combusted. This reduces the oxygen in the exhaust gas. Such a post-injection is, however, carried out only if particularly certain conditions are present in the overrun operation. This includes, for instance, that the lambda value before the Diesel particulate filter is above a certain boundary value, and also perhaps that this has been true for a certain minimum time. Now, according to the exemplary embodiments and/or exemplary methods of the present invention, it is proposed that one should only conclude that there is a leakage in the air supply channel if (a) the lambda value is higher than desired in spite of fuel injection, or (b) if the certain conditions, under which the fuel injection for holding down the lambda value is taking place at all, are just not present, this function is also not activated. However, if this function of the injection of fuel for the purpose of holding down the lambda value is active, that is, if the certain conditions are satisfied, this injection has priority, and leakage in the air supply channel is only regarded as a given for the abovementioned case (a).

This ensures that measures for the protection of the Diesel particulate filter have precedence, and that, by such measures, the detection of leakage in the air supply channel is not disturbed.

After it has been concluded that there is a leakage (above a minimum value), it is advantageous if the carrying out of a regeneration operation is blocked. Otherwise, as a result of a greater leakage, in spite of closing the throttle valve and opening the exhaust gas recirculation valve at low mass flows, the oxygen supply in the particulate filter could become too high and could lead to damage.

One useful embodiment of the method provides that, when has been concluded that there is leakage, an entry is made in a fault memory, and this may be done after the expiration of a defect detection time. Results are thereby able to be stored durably in a control and/or regulating device of the motor vehicle, and are also ready for a later diagnosis. Such a fault memory is executed as an EEPROM, for example.

An exemplary embodiment of the present invention is explained below, with reference to the drawings.

DETAILED DESCRIPTION

Figure 1:
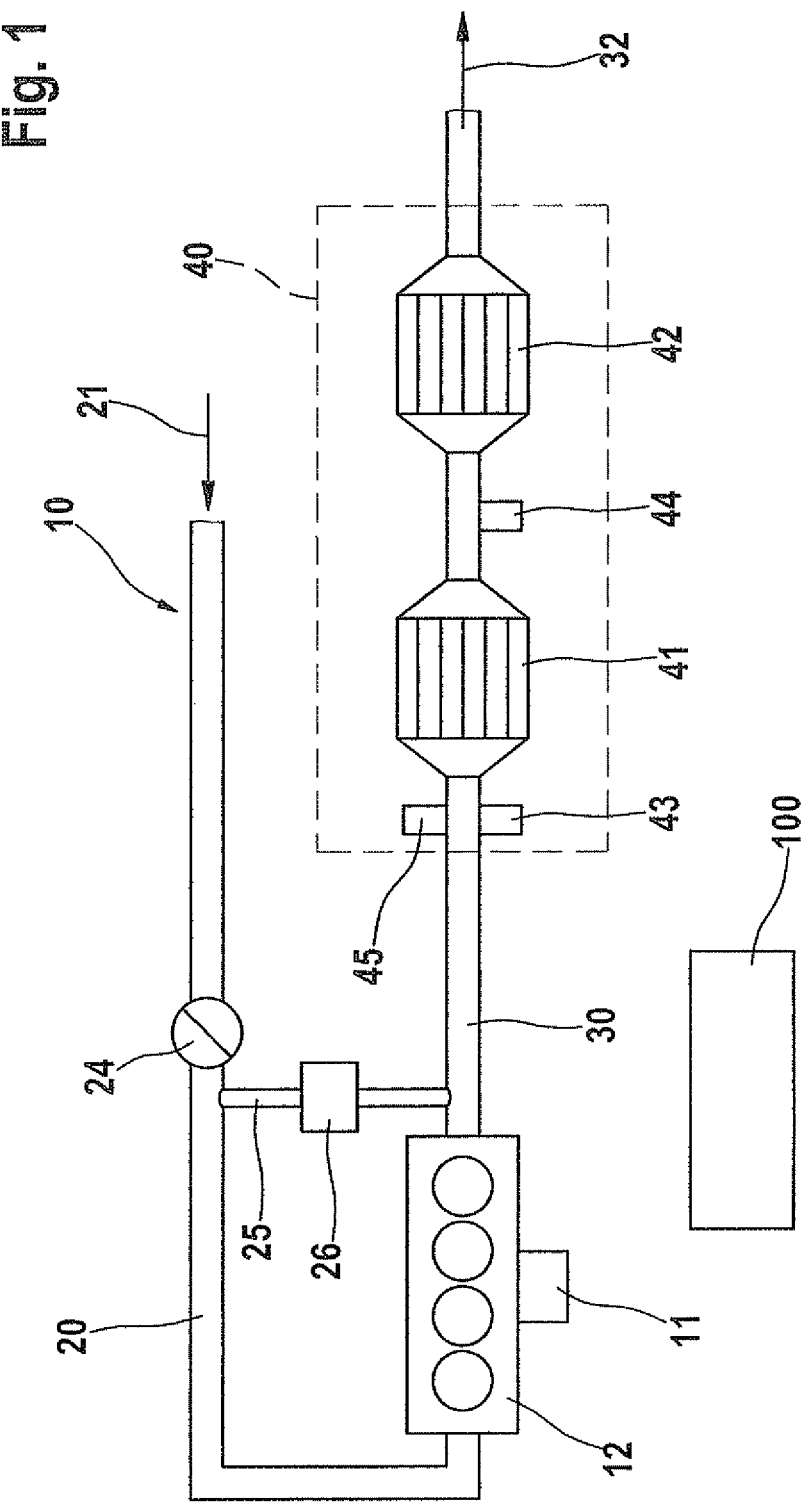
FIG. 1 shows a schematic representation of an internal combustion engine in a motor vehicle.

FIG. 1 shows a schematic representation of an internal combustion engine 10 in the form of a Diesel engine having a cylinder block 12, a fuel metering system 11, an air supply channel 20, in which an air supply flow 21 is guided, and an exhaust gas channel 30 in which an exhaust gas flow 32 of internal combustion engine 10 is guided. In air supply channel 20 there is a throttle valve 24. An exhaust gas recirculation 25 connects air supply channel 20, at least intermittently, to exhaust gas channel 30 via an exhaust gas recirculation valve 26. After cylinder block 12, in the flow direction of exhaust gas flow 32, as components of an exhaust gas aftertreatment system 40 that is associated with internal combustion engine 10, the following are shown: a first lambda probe 43, a fuel supply 45 (optional), an oxidation catalytic converter 41 in the form of a Diesel oxidation catalytic converter, a second lambda probe 44 and a Diesel particulate filter 42. The exhaust gas system of a Diesel engine could also be equipped with only one lambda probe, which would be fully sufficient for the function described. This one lambda probe might then be situated either at position 43 or 44. A control and/or regulating device 100 is also shown schematically, which is used to control various processes of internal combustion engine 10 and system 40 for the exhaust gas aftertreatment, and in which are also located means for the diagnosis of leakage of an air system formed among other things by air supply channel 20 and throttle valve 24, which we shall discuss below.

Exhaust gas recirculation valve 26 is used to mix a part of the exhaust gas flow 32, in the part throttle range of internal combustion engine 10, with the aspirated fresh air flow 21, in a controlled manner. This lowers the combustion temperature of internal combustion engine 10, and reduces the formation of nitrogen oxides ($NO_x$). Undesired compounds contained in the exhaust gas are reduced or removed, using catalytic processes, in oxidation catalytic converter 41. For example, carbon monoxide (CO) and uncombusted hydrocarbons react with nitrogen oxides ($NO_x$) and oxygen ($O_2$) to form carbon dioxide ($CO_2$) and nitrogen ($N_2$). In Diesel engines, particulate filter 42 is used for reducing the particles present in the exhaust gas, in order to satisfy legal conditions.

The particles filtered out of the exhaust gas in particulate filter 42 collect in particulate filter 42 over time. In order to prevent particulate filter 42 from becoming clogged or the exhaust gas counterpressure from reaching an inadmissibly high value, particulate filter 42 is regenerated from time to time. In order to do this, the collected soot particles are combusted in an exothermic reaction. This is brought on, for example, by a brief increase in the exhaust gas temperature. In this context, care should be taken that the temperature of particulate filter 42 does not exceed a critical value, since otherwise its structure could become damaged. A higher temperature of particulate filter 42 or an increased exothermic reaction occurs, for instance, when there is an increase in the oxygen proportion contained in the exhaust gas. In the overrun operation at low mass flows, throttle valve 24 is closed and exhaust gas recirculation valve 26 is opened, in order to stop the oxygen supply in particulate filter 42. An undesired increase in the oxygen proportion then comes about, for example, as a result of a leakage in the air system, by which fresh air is aspirated even when throttle valve 24 is closed. The method described below is used to diagnose such a leakage. In certain cases there is the possibility that the diagnosis will also detect leakiness within the scope of exhaust gas recirculation 25, of exhaust gas recirculation valve 26 or of exhaust gas channel 30.

Figure 2:
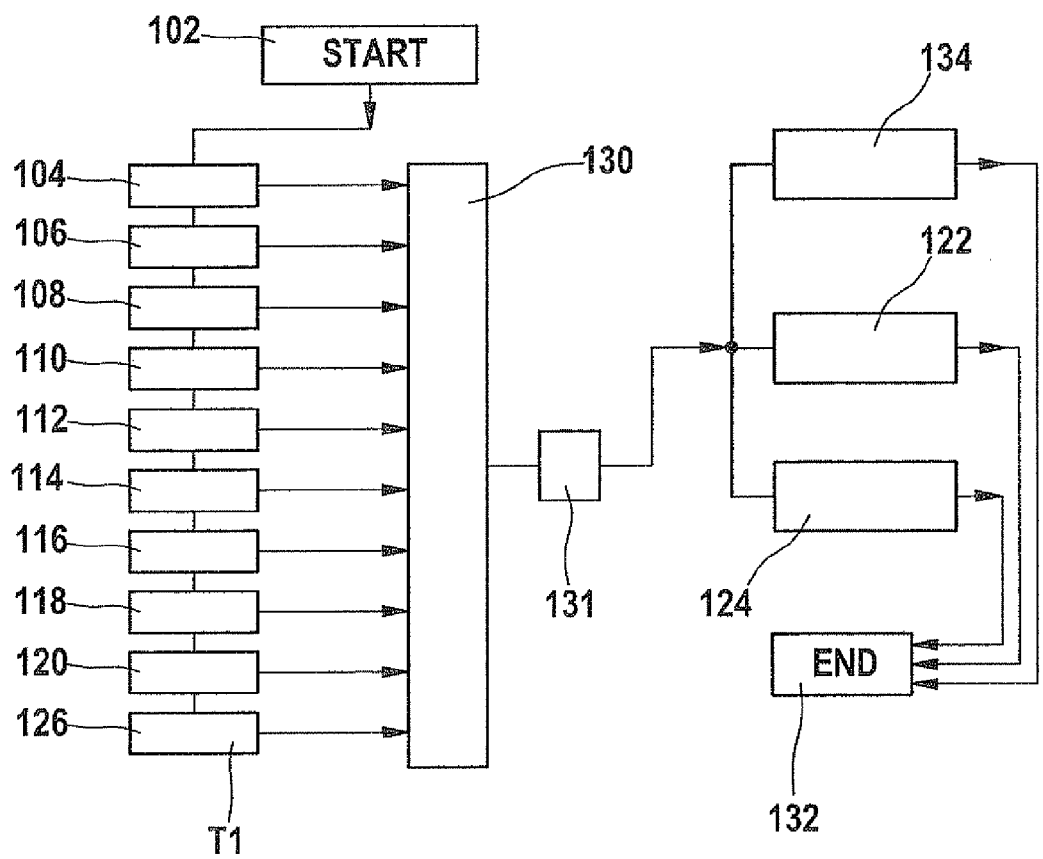
FIG. 2 shows a flow chart of a method for operating the internal combustion engine of FIG. 1.

FIG. 2 shows a flow chart of a method, for instance, for processing by a computer program stored on control and regulating device 100 for diagnosing a leakiness in the air system of internal combustion engine 10 described in FIG. 1. A start block 102 is shown first and a block 104 for querying whether a regeneration operation is currently in progress. In block 106 a query is made as to whether a fault (for instance mechanical jamming or an electrical short circuit) of throttle valve 24 has been detected. Other diagnostic methods are used for this, on which we shall not go into further detail at this point.

In block 108 it is queried whether a fault in the exhaust gas recirculation valve 26 for exhaust gas recirculation 25 has been detected. This, too, is ascertained using a separate diagnostic method, which will not be explained in detail here. A block 110 is used to query whether exhaust gas recirculation valve 26 is in an open state for exhaust gas recirculation 25. In 112 it is queried whether a control command of control and/or regulating device 100 for closing throttle valve 24 is present, and in 114 it is queried whether internal combustion engine 10 has been in overrun operation at least since a specified time interval.

In block 116 it is checked whether the current speed of internal combustion engine 10 is below a specified threshold value, while it is possible, in an exemplary embodiment that is not shown, that an engine speed is involved that is averaged over a specified time interval. Furthermore, a block 118 is used to query whether a change in a rotational speed (rotational speed gradient) of internal combustion engine 10 since a specified time interval is below a specified threshold. The last two tests ensure that the internal combustion engine is in an at least approximately stationary operating state (no gear change) at a relatively low engine speed.

Now, in block 120 the actual diagnosis of the tightness of the air system takes place. There the query is whether the measured value given by lambda probes 43, 44 has been above a specified threshold since a specified minimum time interval. In a monitoring 126, it is checked whether a countermeasure for an injection of fuel in the overrun operation of the internal combustion engine is active in a process that is taking place outside of FIG. 2, and is not explained in greater detail here. However, provided this countermeasure is indeed active, but shorter than a specified time span T1 (defect detection time), an output signal via monitoring 126 is set to "FALSE". In all other cases, monitoring 126 accepts output signal "TRUE", and thus releases block 130. Blocks 104 to 120 and 126 pass their logical information to a block 130, where they are linked to a logical AND. If block 130 supplies the value "TRUE", which is the case if all tests in 104 to 120 and 126 simultaneously supply the value TRUE, then, after a filtering in a block 131, in a block 122 an alarm is triggered on the dashboard of the motor vehicle that incorporates internal combustion engine 10 (both not shown). This indicates a faulty function to the driver at once. In addition, in a block 124 specific reactions are triggered, for instance a regeneration operation is blocked. Moreover, in a block 134 an entry may be made in a fault memory. After blocks 122, 124 and 134 the method ends in block 132. The method may also be carried out repeatedly, so that one may detect changes in operating behavior at once. Block 131 permits filtering and/or delaying, as required, the output signal of AND operation 130.

Monitoring 126 takes into account that, when certain conditions apply, a possible countermeasure may be activated which, outside of the method described, injects a certain quantity of fuel into the internal combustion engine, for holding down the lambda value and for protecting particulate filter 42. In this case, at least one defect detection time T1 is awaited to see whether the countermeasure demonstrates sufficient action, as a result of which one or more of the output signals of blocks 104 to 120 could assume a state of "FALSE" again. Thereupon AND operation 130 would also change from a "TRUE" state back to a "FALSE" state that is defined as fault-free. In this way, monitoring 126 prevents overly hasty reactions in blocks 122, 124 and 134. In an in-common application of said countermeasure, using the method shown in FIG. 2, it is advisable to limit the fuel injection, brought about by the countermeasure, in such a way that no noticeable torque is generated.

The main item shown in the partial procedure shown in FIG. 2 is queries 104, 106, 108, 110, 112, 114, 116, 118, 120 and 126 of various operating values and parameters of the internal combustion engine shown in FIG. 1, as well as their logical linkage in block 130, implemented presently as a Boolean AND operation. This linkage may either be performed in parallel by a digital logic circuit or, alternatively, by sequential processing in a computer programs. If all the input variables become valid, the output variable of the AND operation will also be valid, and thus leakiness of the air system is detected. It is clear that the logical linkages described, dependent on implementation, may also be described or produced using different logical states, for instance, using De Morgan's test. The logical linkages may also be structured differently.

For instance, the filtering implemented in block 131 may also take place individually for each branch of blocks 104 to 120 and 126 before AND operation 130, or the functioning of monitoring 126 may be implemented after AND operation 130.

In one embodiment, not shown, of the flow chart described in FIG. 2, the functioning of monitoring 126 is restricted to a temporary blocking of the fault memory in block 134. In this context, the function of blocks 122 and/or 124 may be kept up independently of monitoring 126.

Figure 3:
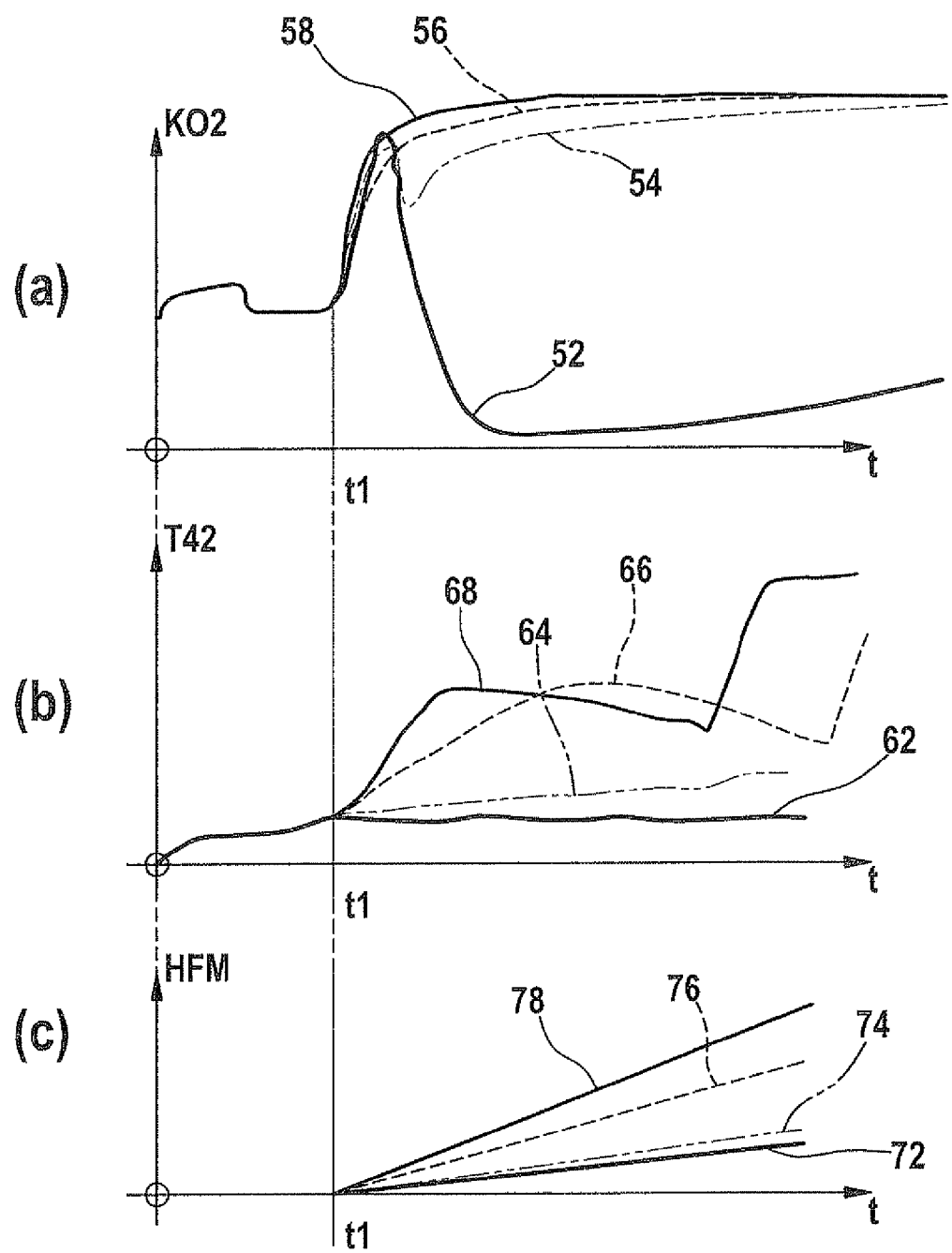
FIG. 3 shows three diagrams for a lambda probe signal, a temperature curve in a particulate filter and an air mass signal.

FIG. 3 shows various diagrams for explaining the physical connections of the abovementioned method:

Diagram (a) shows the curve over time of a signal of lambda probe 44, by which the oxygen concentration KO2 contained in the exhaust gas is expressed, for four degrees of leakage, in air supply channel 20. The corresponding curves are marked 52 (no leakage) to 58 (considerable leakage). It may be seen that, at a time t1, throttle valve 24 receives a control signal by which it is to be controlled to take up the completely closed position. If there is any leakage (curve 52) the lambda probe signal is comparatively low. If there is even only slight leakage (curve 54), a clearly increased lambda probe signal comes about.

Diagram (b) shows the corresponding curve over time of temperature T42 in Diesel particulate filter 42 for the four degrees of leakage, mentioned above, in air supply channel 20 as of time t1. The corresponding curves are characterized by 62 (no leakage) to 68 (considerable leakage). It will be seen that the temperature in the operating case shown (low engine speed, exhaust gas recirculation valve 26 open, exothermic regeneration reaction) at no leakage present (curve 62) is comparatively low, whereas it is increased even at low leakage (curve 64).

Diagram (c) shows the curve over time of signals of an HFM sensor, that is not shown in FIG. 1, but that is situated in air supply channel 20, again, corresponding to the four grades of leakage specified above. It will be seen that curve 72 (no leakage) and curve 74 (slight leakage) are almost coincident.

It will be seen in FIG. 3 that leakiness of an air system cannot be detected with sufficient accuracy by the evaluation of the signal of an HFM sensor (diagram (c)) in a control and regulating device 100. Although curves 72 and 74 in diagram (c) lie close together, the reactions in particulate filter 42 (curves 62 and 64) are very different. Immediately after activating throttle valve 24 into the closed position, an inadmissible leakiness is able to be detected via lambda probe signal 52, 54, 56, 58. It will be seen in FIG. 3 (a) how lambda probe signals 54, 56, 58 differ from lambda probe signal 52, which sets in in response to a closed throttle valve 24. From this one may also derive the threshold values and time constants, by which this distinguishing is to be carried out.

What is claimed is:

1. A method for operating an internal combustion engine in a motor vehicle, the method comprising:
supplying air to a combustion chamber via a throttle valve and an air supply channel;
conducting exhaust gas through a particulate filter;
returning exhaust gas at least intermittently and at least partially through an exhaust gas recirculation valve into the air supply channel;
detecting an oxygen proportion in the exhaust gas using at least one lambda probe; controlling, only during an overrun operation, the throttle valve to close and controlling the exhaust gas recirculation valve to open; comparing a variable characterizing the oxygen proportion in the exhaust gas to a boundary value; and at least as a function of the result of this comparison, concluding that there is a leakage in the air supply channel.

2. The method of claim 1, wherein the comparing is only performed when a current rotational speed of the internal combustion engine is below a rotational speed boundary value.

3. The method of claim 1, wherein the comparing is only performed when no faults have been diagnosed at the throttle valve and the exhaust gas recirculation valve.

4. The method of claim 1, wherein the comparing is only performed when a gradient of a rotational speed of the internal combustion engine is below a gradient boundary value for a certain minimum time period.

5. The method of claim 1, wherein the comparing is only performed when the overrun operation is present for a certain minimum time period.

6. The method of claim 1, wherein fuel is injected under certain conditions in the overrun operation, for keeping the lambda value below a lambda value boundary value, and wherein it may only be determined that there is leakage in the air supply channel if the lambda value at least one of reaches and exceeds the lambda value boundary value in spite of the fuel injection, or if these certain conditions are not present.

7. The method of claim 1, wherein, when it has been determined that there is leakage, a performing of a regeneration operation is blocked.

8. The method of claim 1, wherein, when it is determined that there is leakage, an entry takes place in a fault memory.

9. The method of claim 1, wherein, when it is determined that there is leakage, an entry takes place in a fault memory, after an expiration of a defect detection time.

10. A non-transitory computer readable medium having a computer program, which is executable by a processor, comprising:
   a program code arrangement having program code for operating an internal combustion engine in a motor vehicle, by performing the following:
      supplying air to a combustion chamber via a throttle valve and an air supply channel;
      conducting exhaust gas through a particulate filter;
      returning exhaust gas at least intermittently and at least partially through an exhaust gas recirculation valve into the air supply channel;
      detecting an oxygen proportion in the exhaust gas using at least one lambda probe;
      only during an overrun operation, controlling the throttle valve to close and controlling the exhaust gas recirculation valve to open;
      comparing a variable characterizing the oxygen proportion in the exhaust gas to a boundary value; and
      determining, at least as a function of the result of the comparing, that there is a leakage in the air supply channel.

11. The computer readable medium of claim 10, wherein, when it is determined that there is leakage, an entry takes place in a fault memory, after an expiration of a defect detection time.

12. A control device for an exhaust gas aftertreatment system of an internal combustion engine of a motor vehicle, comprising:
   a processor arrangement having program code for operating an internal combustion engine in a motor vehicle, by performing the following:
      supplying air to a combustion chamber via a throttle valve and an air supply channel;
      conducting exhaust gas through a particulate filter;
      returning exhaust gas at least intermittently and at least partially through an exhaust gas recirculation valve into the air supply channel;
      detecting an oxygen proportion in the exhaust gas using at least one lambda probe;
      only during an overrun operation, controlling the throttle valve to close and controlling the exhaust gas recirculation valve to open;
      comparing a variable characterizing the oxygen proportion in the exhaust gas to a boundary value; and
      determining, at least as a function of the result of the comparing, that there is a leakage in the air supply channel.

13. The control device of claim 12, wherein the comparing is only performed when a current rotational speed of the internal combustion engine is below a rotational speed boundary value.

14. The control device of claim 12, wherein the comparing is only performed when no faults have been diagnosed at the throttle valve and the exhaust gas recirculation valve.

15. The control device of claim 12, wherein the comparing is only performed when a gradient of a rotational speed of the internal combustion engine is below a gradient boundary value for a certain minimum time period.

16. The control device of claim 12, wherein the comparing is only performed when the overrun operation is present for a certain minimum time period.

17. The control device of claim 12, wherein fuel is injected under certain conditions in the overrun operation, for keeping the lambda value below a lambda value boundary value, and wherein it may only be determined that there is leakage in the air supply channel if the lambda value at least one of reaches and exceeds the lambda value boundary value in spite of the fuel injection, or if these certain conditions are not present.

18. The control device of claim 12, wherein, when it has been determined that there is leakage, a performing of a regeneration operation is blocked.

19. The control device of claim 12, wherein, when it is determined that there is leakage, an entry takes place in a fault memory.

* * * * *